United States Patent [19]
Delagrange et al.

[11] Patent Number: 5,878,211
[45] Date of Patent: Mar. 2, 1999

[54] MULTI-FUNCTIONAL RETAIL TERMINAL AND ASSOCIATED METHOD

[75] Inventors: Mikel R. Delagrange; Lynn L. Kerchner, both of Duluth; Paul M. Pirillo, Monroe, all of Ga.

[73] Assignee: N C R Corporation, Dayton, Ohio

[21] Appl. No.: 771,323

[22] Filed: Dec. 20, 1996

[51] Int. Cl.⁶ .................................................. G06P 11/00
[52] U.S. Cl. ...................................... 395/186; 395/187.01
[58] Field of Search .............................. 395/186, 187.01, 395/281, 200.59; 361/683; 405/16, 18; 380/3, 4, 23, 25

[56] References Cited

U.S. PATENT DOCUMENTS

| | | | |
|---|---|---|---|
| 5,477,415 | 12/1995 | Mitcham et al. ........................ | 361/686 |
| 5,627,974 | 5/1997 | Watts et al. .............................. | 395/281 |
| 5,640,002 | 6/1997 | Ruppert et al. .......................... | 235/472 |
| 5,657,317 | 8/1997 | Mahany et al. .......................... | 370/338 |
| 5,727,153 | 3/1998 | Powell ........................................ | 705/4 |
| 5,774,874 | 6/1998 | Veeneman et al. ....................... | 705/24 |

*Primary Examiner*—Robert W. Beausoliel, Jr.
*Assistant Examiner*—Pierre E. Elisca
*Attorney, Agent, or Firm*—Maginot, Addison & Moore

[57] ABSTRACT

A method for maintaining security of a retail terminal having a docking station and a portable computer includes the computer-implemented steps of receiving an unlocking attempt to unlock the portable computer from the docking station; determining whether the unlocking attempt is valid; and unlocking the portable computer from the docking station if the unlocking attempt is valid. A multi-functional retail terminal is also disclosed.

21 Claims, 8 Drawing Sheets

MULTI-FUNCTIONAL RETAIL TERMINAL AND ASSOCIATED METHOD

BACKGROUND OF THE INVENTION

The present invention relates generally to point of sale terminals, and more particularly to a multi-functional retail terminal having a software controlled locking mechanism for securing a portable computer to a docking station.

Retailers are currently maintaining three separate store automation platforms in their stores in order to remain competitive. These automation platforms include data collect terminals, point of sale (POS) systems, and multi-functional terminals. The data collect terminals are primarily used to perform a physical inventory, cycle counts, price management, store receiving and transfers, markups, and markdowns. The POS systems are primarily used to record transactions, to perform credit authorization, and to feed host inventory and merchandising systems. Furthermore, the multi-functional terminals are used to provide decision support, sales assisted shopping, category management, scheduling, and other managerial tasks.

The problem with maintaining these three automation solution platforms is that each piece on average costs $2,000. Therefore, retailers are finding it very difficult to afford to keep up to date due to the cost multiplier of maintaining three automation solution platforms. Therefore, there is needed a multi-functional terminal which provides the retailer with the functionality of all three automation solution platforms.

One such multi-functional terminal is that of the present invention and includes a docking station and a portable computer which is capable of general purpose computing. As a result of this configuration, the multi-functional terminal can provide the retailer with a wide array of functionality via various software programs executing on the portable computer. However, the problem with portable computers is that they are highly portable as well as highly concealable. Therefore, the retailer is faced with issues of how to maintain tight control over who, when and how the portable computers are used.

Docking stations serve a well-known purpose of connecting portable computers to peripheral components, computer networks and recharging equipment. Some docking stations also provide an option for locking a portable computing device securely to the docking station using a conventional key and mechanical latch. However, the loss or theft of keys can result in costs incurred to re-key the lock(s) if security is compromised. In addition, breakage and reliability problems with keys can result in key replacement costs. If each docking station has a unique key associated therewith, then each user must be provided with a key for each docking station which the person is authorized to use. In a retail environment, this could mean issuing dozens of keys per user. In addition, if a user is issued keys on a daily basis for the docking station(s) that the user is expected to use, then the flexibility to easily move to other docking stations is lost. In contrast, if all docking stations in a given department, or in the entire store use the same keys, then individual accountability for the portable computers is lost, and tracking mobile users can be complicated and time consuming.

What is needed therefore for this multi-functional retail terminal is a method for securing a portable computing device to a docking station which overcomes the disadvantages associated with using a conventional key and mechanical latch to lock a portable computing device securely to a docking station.

SUMMARY OF THE INVENTION

In accordance with one embodiment of the present invention, there is provided a method for maintaining security of a retail terminal having a docking station and a portable computer. The method includes the computer-implemented steps of receiving an unlocking attempt to unlock the portable computer from the docking station; determining whether the unlocking attempt is valid; and unlocking the portable computer from the docking station if the unlocking attempt is valid.

Pursuant to another embodiment of the present invention, there is provided a multi-functional retail terminal. The multi-functional retail terminal includes a docking station, a portable computer, and a coupler configured to detachably couple the portable computer to the docking station. The docking station includes a retail peripheral, and the portable computer and the docking station are configured to perform a point of sale transaction and general purpose computing.

In accordance with yet another embodiment of the present invention, there is provided a retail network. The retail network includes a network server, a docking station, a portable computer, a coupler, and a network interface. The coupler is configured to detachably couple the portable computer to the docking station. The network interface is configured to provide a communications link between the network server and the docking station. Furthermore, the docking station includes a retail peripheral, and the portable computer and the docking station are configured to perform a point of sale transaction and general purpose computing.

It is therefore an object of the present invention to provide a new and useful retail terminal.

It is another object of the present invention to provide an improved retail terminal.

It is still another object of the present invention to provide a retail terminal which may be used as a retail terminal and a general purpose computer.

It is yet another object of the present invention to provide a retail terminal which allows portable use of some of the functionality of the retail terminal.

It is still another object of the present invention to provide a new and useful method of tracking portable computers.

It is another object of the present invention to provide an improved method of securing portable computers to docking stations.

It is yet another object of the present invention to provide an improved method of securing a portable computer to a docking station without using a mechanical key.

These and other features, aspects, and advantages of the present invention will become better understood with regard to the following description, appended claims, and accompanying drawings.

DETAILED DESCRIPTION OF A PREFERRED EMBODIMENT

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
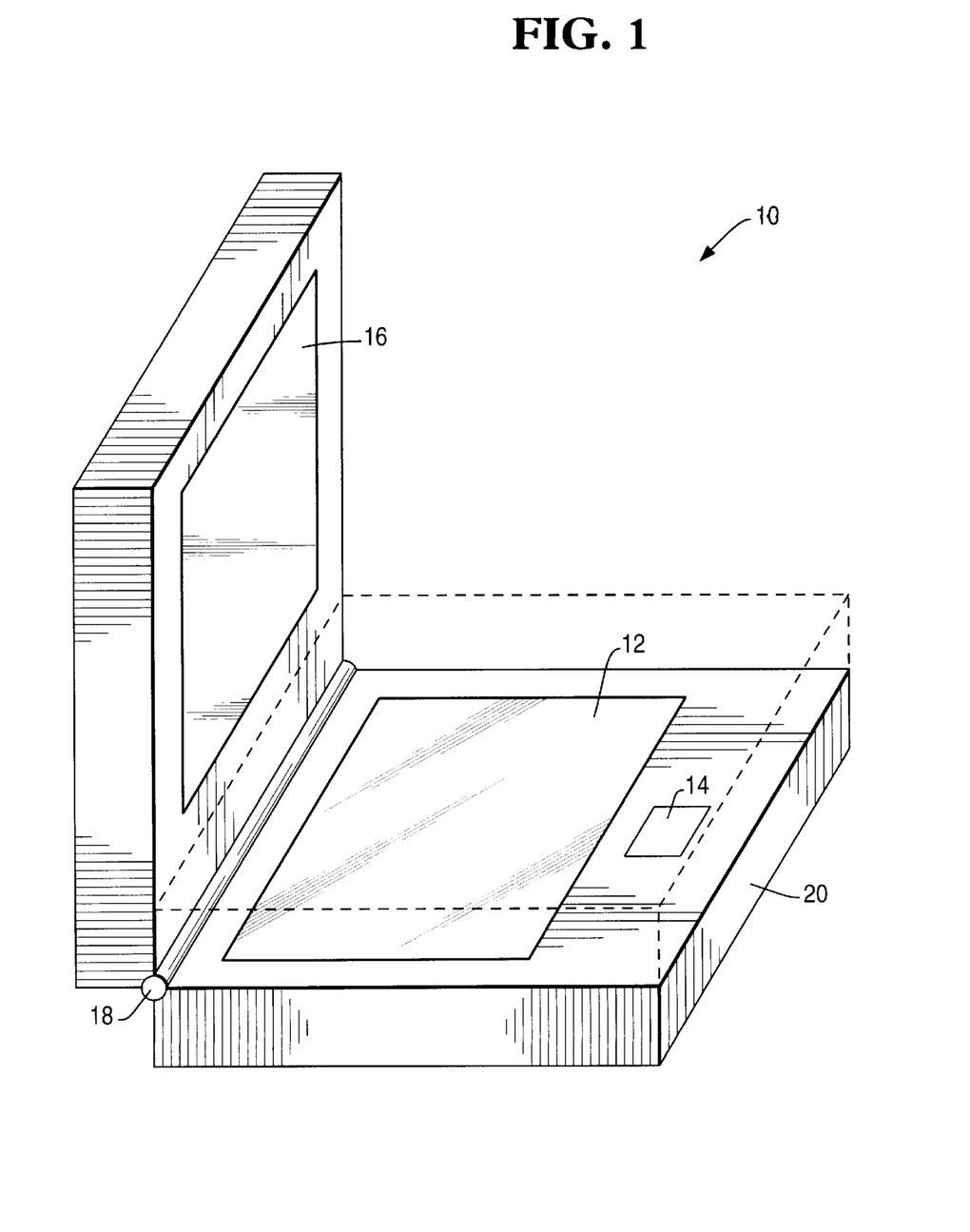
FIG. 1 is a perspective view of an exemplary portable computing device.

Referring now to FIG. 1, there is shown a portable computing device or portable computer 10, such as handheld, notebook or lap-top computer which incorporates features of the present invention therein. The portable computer 10 conventionally includes a keyboard 12, pointing device 14 such as a mouse or touch pad, and display screen 16. The display screen 16 is pivotally mounted to a base 20 by a hinge 18.

Figure 2:
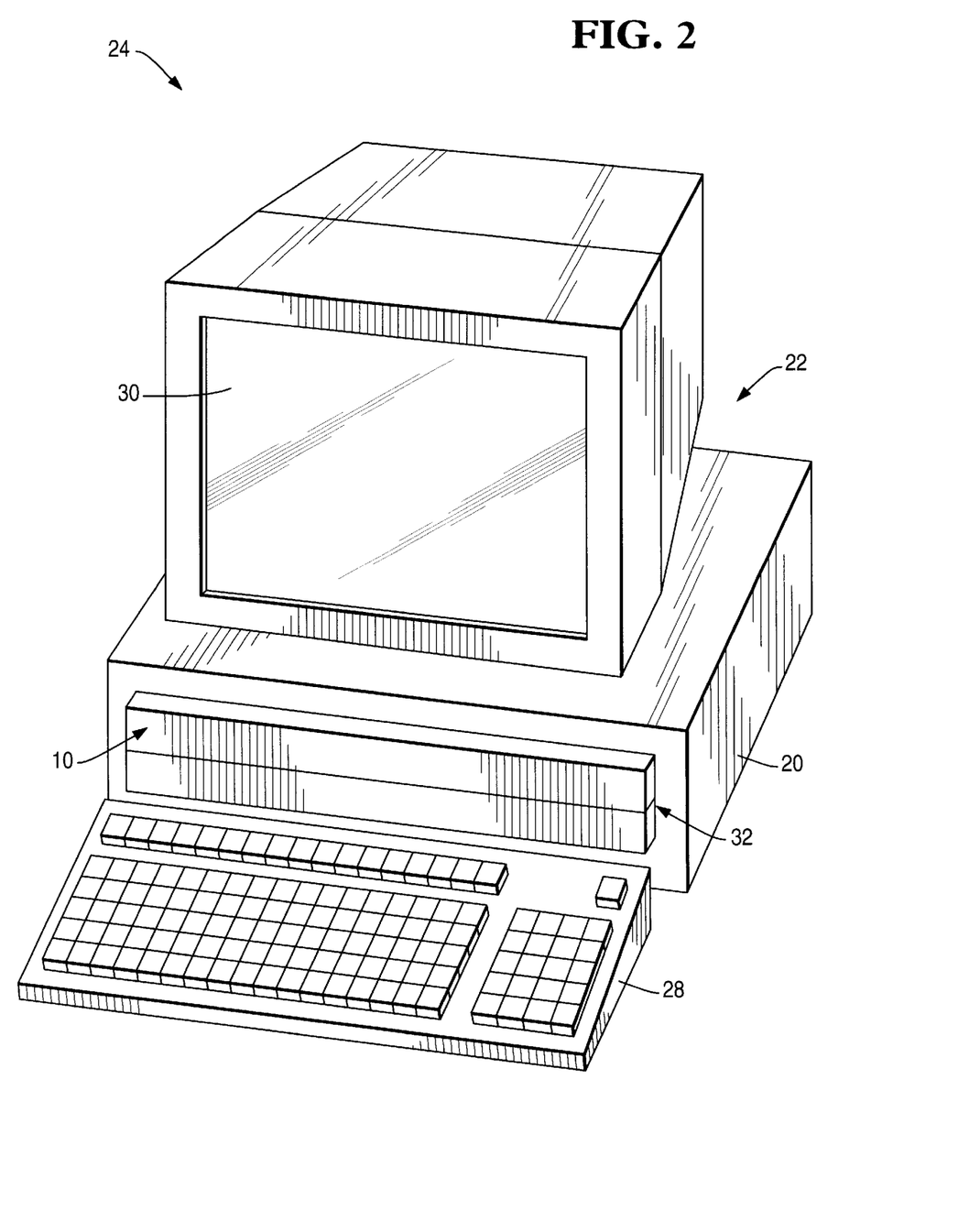
FIG. 2 is a perspective view of a portable computing device and a docking station which cooperate to define a retail terminal that incorporates features of the present invention therein.

As shown in FIG. 2, the portable computer 10 may be docked to a docking station 22. What is meant herein by the use of the term "docked" or "docking" is to operatively connect or couple the portable computer 10 to the docking station 22 so that data may be transferred and power may flow therebetween. It should be appreciated that while the portable computer 10 is docked to the docking station 22, the portable computer 10 may or may not be locked to the docking station 22. Thus, the portable computer 10 may be (1) undocked from the docking station 22, (2) docked and locked to the docking station 22, or (3) docked and unlocked to the docking station 22.

The portable computer 10 and the docking station 22 cooperate to define a multi-functional retail terminal 24 for use as a POS system, a data collection terminal, or as a general purpose terminal at any other location within a retail environment (e.g. stockroom, sales floor, store office, etc.). The docking station 22 may conventionally include a base unit 26, a keyboard 28, a display monitor 30, and/or various retail peripherals 41 (see FIG. 4) such as a magnetic strip reader (MSR), a smart card reader, a bar code reader, a magnetic ink character recognizer (MICR), an imprinter, a cash drawer, a weight scale, a security tag deactivator, and other checkout lane devices. The base unit 26 may include a recess 32 for receiving the portable computer 10 in a conventional manner.

Figure 3:
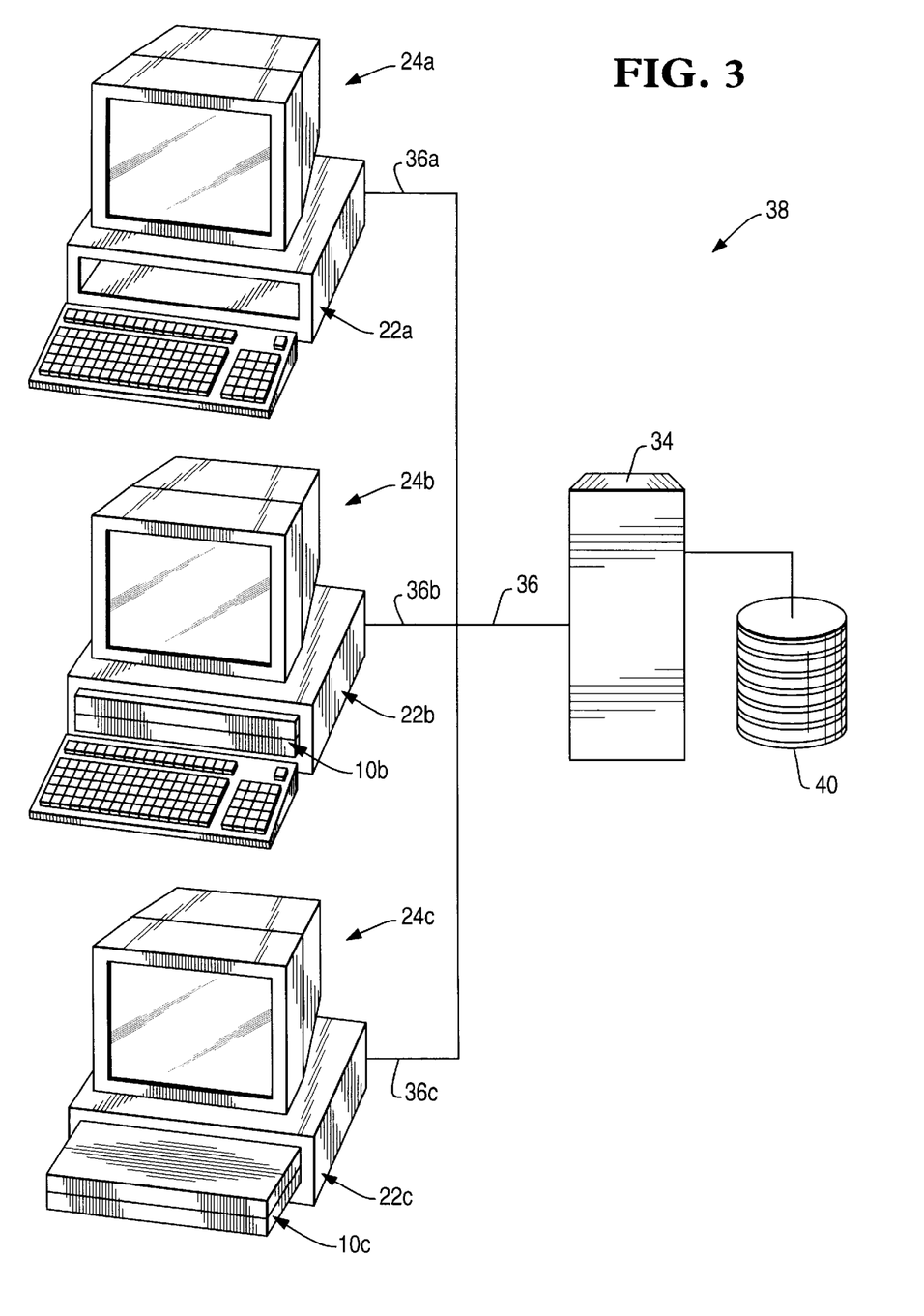
FIG. 3 is a perspective view of a number of retail terminals connected together to form a network.

As shown in FIG. 3, a number of multi-functional retail terminals 24a–24c may be connected to a network server 34 through a wired connection 36 to form a network 38 such as a local area network (LAN) or wide area network (WAN). For example, the first multi-functional retail terminal 24a having a docking station 22a without a computer docked thereto, is connected to network 38 through a wired connection 36a. The second multi-functional retail terminal 24b having a docking station 22b with a portable computer 10b docked thereto, is connected to network 38 through wired connection 36b. The third multi-functional retail terminal 24c having a docking station 22c with a portable computer 10c seated but not docked thereto, is connected to network 38 through wired connection 36c. The wired connections 36a–36b merely provide a communications link between the multi-functional retail terminals 24a–24c and the network 38. As a result, if the network 38 includes means for wireless communications, then the wired connections 36a–36b may not be necessary. Furthermore, the network 38 includes a mass storage device 40 connected to the network server 34. Besides providing a centralized data base of inventory and other information, the network server 34 may also use this mass storage device 40 to maintain a security log and a user rights table for use in approving or denying a user request to lock or unlock a portable computer 10 to or from a docking station 22 as described further below.

Figure 4:
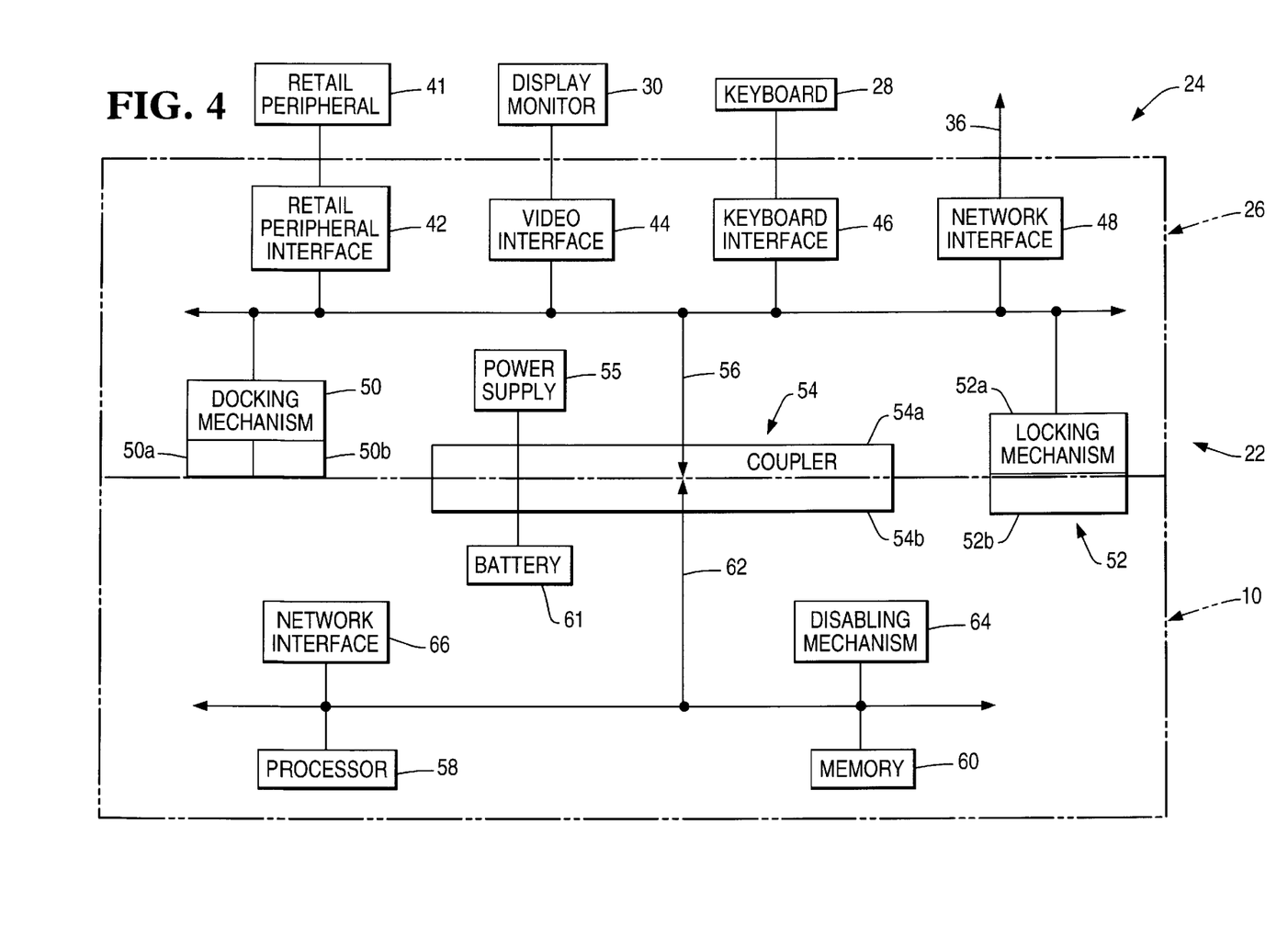
FIG. 4 is a simplified block diagram of a preferred embodiment of the retail terminal shown in FIG. 2.

Referring now to FIG. 4, there is shown a simplified block diagram of a first embodiment of the multi-functional retail terminal 24. The docking station 22, and more particularly the base unit 26 may include retail peripheral interface 42, video interface 44, keyboard interface 46, network interface 48, docking mechanism 50, locking mechanism 52a, data/power coupler 54a and power supply 55. The retail peripheral interface 42, video interface 44, keyboard interface 46, network interface 48, docking mechanism 50, locking mechanism 52a, and data/power coupler 54a are operatively coupled to a system bus 56. The portable computer 10 includes a locking mechanism 52b, data/power coupler 54b, processor 58, memory 60, battery-backed power supply 61, a disabling mechanism 64, and a network interface 66. The data/power coupler 54b, processor 58, memory 60, disabling mechanism 64, and network interface 66 are coupled to a system bus 62. The system buses 56, 62 may comply with any known bus architectures such as PCI, ISA, EISA, etc.

The retail peripheral interface 42 includes circuitry which conventionally permits data transfers between a retail peripheral 41 and the retail terminal 24. For example, the retail peripheral interface 42 may include a known circuitry for providing serial, parallel, and/or USB (universal serial bus) interfaces for data transfers between the retail peripheral 42 and the retail terminal 24. The retail peripheral interface 42 may also include connectors for directly coupling a retail peripheral 41 to the system bus 56 of the retail terminal.

The video interface 44 includes circuitry which conventionally generates a video signal that is sent to the display monitor 30. The video interface 44 may be implemented as an expansion card seated in an expansion slot of the docking station 22. It should be appreciated that the video interface 44 may alternatively be implemented as part of the video display monitor 30, or as part of a main system board or motherboard of either the portable computer 10 or the docking station 22.

The keyboard interface 46 includes circuitry which conventionally controls the flow of information from the keyboard 28 to the processor 58. That is, the keyboard interface 46 waits for and buffers keystroke signals generated by keyboard 28 for input to the processor 58.

The network interface 48 includes circuitry which conventionally permits the docking station to communicate with network 38 (FIG. 3) through wired connection 36. For example, the network interface 48 may include a known Ethernet expansion card, and the wired connection 36 may include a known twisted-pair communication line. Alternatively, the network interface 48 may support wireless communications with network 38.

The docking mechanism 50 may be a conventional mechanical mechanism including mechanical linkage for (1) guiding the portable computer 10 into operative engagement with the docking station 22 under an urging force applied by a user, and (2) guiding the portable computer 10 out of operative engagement with the docking station 22 under an urging force applied by a user or an ejection button (not shown) coupled to the docking mechanism 50.

Alternatively, the docking mechanism 50 may be a conventional electromechanical mechanism including a driver motor 50a and a sensing mechanism 50b. The drive motor 50a in combination with mechanical linkage guides the portable computer 10 into and out of operative engagement with the docking station 22. The drive motor 50a may be equipped to urge portable computer 10 outwardly from the recess 32 and out of operative engagement of the docking station 22 in response to either (a) an activation of an ejection button (not shown) or (b) an ejection signal sent from the portable computer 10, the docking station 22, or the network server 34. Furthermore, the sensing mechanism 50b senses whether a user is sliding the portable computer 10 into recess 32 of base unit 26 and activates the drive motor 50a to guide the portable computer 10 into operative engagement with the docking station 22 when the portable computer 10 is sensed.

It should be appreciated that the sensing mechanism 50b may be implemented in various different ways. For example, the sensing mechanism 50b may be implemented to detect a electrical signal from the portable computer 10, a electromagnetic signal from the portable computer 10, a breakage of an infrared beam by the portable computer 10, or an activation of a mechanical switch by the portable computer 10.

The locking mechanism 52a cooperates with the locking mechanism 52b to define a conventional electromechanical locking mechanism 52 which permits a user to electromechanically lock and unlock the portable computer 10 to and from the docking station 22 while the portable computer 10 is docked to the docking station 22. In particular, the user, under software control, may cause one of the locking mechanisms 52a, 52b to drive into locking engagement with the other of the locking mechanisms 52a, 52b. The user, under software control, may also cause one of the locking mechanisms 52a, 52b to drivingly disengage from the other of the locking mechanisms 52a, 52b in a known manner. At least one of the locking mechanisms 52a, 52b is responsive to a lock/unlock signal from the processor 58 for driving into and out of engagement with the other of the locking mechanisms 52a, 52b.

The processor 58 interprets and executes instructions in a known manner. That is, the processor 58 fetches, decodes and executes instructions, and transfers data to and from other resources such as the memory 60 over the system bus 62. In an exemplary embodiment, the processor 58 may be an Intel™ Pentium™ processor.

The memory 60 is the main general-purpose storage region to which the processor 58 has direct access to data and instructions which are dynamically stored therein. The main memory 60 is typically implemented using random access memory (RAM) which comes in many different forms (e.g. DRAM, and EDO). Furthermore, most computer systems implement memory 60 in a hierarchical manner in which memory 60 is comprised of various memory levels. For example, memory 60 may be comprised of cache memory, base memory, expanded memory, and/or extended memory.

The data/power coupler 54a is operatively coupled to data/power coupler 54b when the portable computer 10 is docked to the docking station 22. Any known mutually conforming data/power couplers 54a, 54b are suitable for use with the portable computer 10 and docking station 22. When the data/power couplers 54a, 54b are connected together, the processor 58 may communicate with the network interface 36, video interface 44, keyboard interface 46, docking mechanism 50 and locking mechanism 52a through the system buses 56, 62. Likewise, when the data/power couplers 54a, 54b are connected together, a source of DC voltage is coupled from the power supply 55 to the battery-backed power supply 61 in a conventional manner.

The network interface 66 includes circuitry which conventionally permits the docking station to communicate with network 38 (FIG. 3) through a wireless connection. The network interface 66 functions much like the network interface 48 of the base unit 26. It should be appreciated that two separate network interfaces 48, 66 are not critical to the functionality of the present invention and embodiments having only one or the other network interface 48, 66 may be desirable for cost benefit reasons. However, the presence of both network interfaces 48, 66 does provide additional advantages to the multi-functional retail terminal 24.

For example, the network interface 66 of the portable computer 10 allows the portable computer 10 to communicate with network 38 when not docked to docking station 22. This allows a salesperson to use the portable computer 10 to do floor inventory counts and obtain access to a central inventory database without being confined to a stationary multi-functional retail terminal 24. Furthermore, the network interface 66 provides the network server 34 with a means of activating the disabling mechanism 64 when the portable computer 10 is not docked to the docking station 22 thereby providing another means of defense against theft of the portable computer 10.

The network interface 48 of the base unit 26 also provides a communications link that is not dependent upon the network interface 66 of the portable computer 10. This back-up communications link may be quite helpful for maintaining security of the portable computer 10 when the network interface 66 is not functioning (e.g. battery 61 is not sufficiently charged, the disabling mechanism 64 has been activate, etc.)

The disabling mechanism 64 provides the multi-functional retail terminal 24 with a means to disable portable computer 10 thereby placing the portable computer 10 in an unusable state. For example, portable computer 10 may be disabled because (1) the portable computer 10 was forcibly removed from the docking station 22, (2) the portable computer 10 has remained undocked beyond a preset period of time, or (3) any other security violation or reason for disabling portable computer 10 to maintain security. The disabling mechanism 64 may be implemented in hardware, software or a combination of both and may accomplish its goal of disabling portable computer 10 via several known techniques. For example, the disabling mechanism 64 may cause the portable computer 10 to refuse to load and run software, corrupt memory 60, and/or corrupt the hard disk (not shown).

The base unit 26 may also include a processor or other control circuitry (not shown) that would allow the docking station 22 to provide some functionality even when no portable computer 10 is docked. As a result of the network interface 48, the processor or control circuitry may not need to be substantial because complicated tasks may be executed on the network server 34 of the network 38 with the docking station 22 essentially only transmitting input to the network server 34 and displaying output from the network server 34. However, the docking station 22 may include a substantial processor thereby reducing demands on the network server 34.

Figure 5:
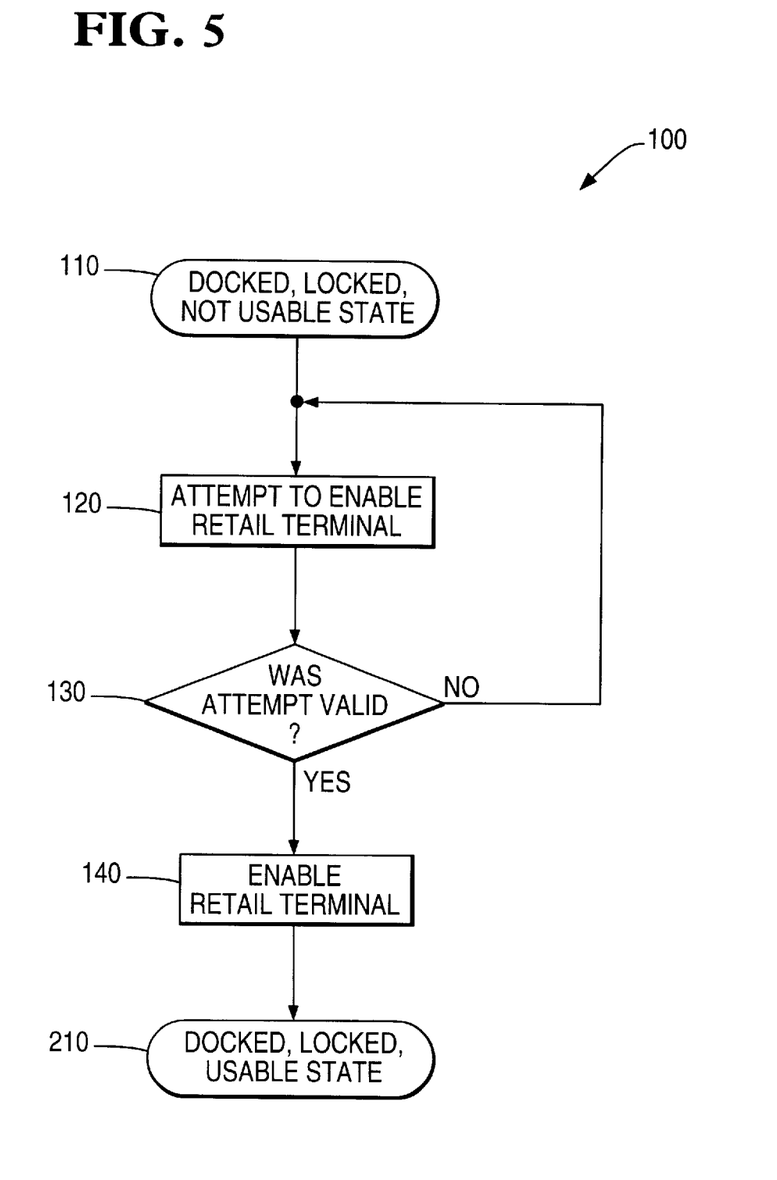
FIG. 5 is a procedural flowchart for enabling the retail terminal for use.

Referring now to FIG. 5, there is shown a procedural flowchart or routine 100 for enabling the multi-functional retail terminal 24 for use when the multi-functional retail terminal 24 is not enabled for use and the portable computer 10 is docked and locked to the docking station 22. In other words, the portable computer 10 is in a docked, locked, not useable state 110 and a user wishes to enable the multi-functional retail terminal 24 for use. For example, the user may wish to enable the multi-functional retail terminal 24 in order to perform a point of sale transaction.

In step 120, an attempt is made to enable the multi-functional retail terminal 24 for use. This attempt may be made by way of several possible techniques which may include (a) a user entering a password via a keyboard, a mouse, or a touch screen; (b) a user swiping a card through a magnetic strip reader; (c) a user swiping a bar code on an I.D. badge; (d) a user speaking into a voice recognition system; (e) a user using a fingerprint reader, hand size reader, or other biometric device; and/or (f) a system administrator, a supervisor, or a scheduling program transmitting a command to the multi-functional retail terminal 24 via the network 38.

The portable computer 10, the docking station 22, and /or the network server 34 in step 130 determine whether the attempt to enable the multi-functional retail terminal 24 in step 120 was valid. The validity of the attempt may be determined by comparing the information received in step 120 with a user rights table. The user rights table may contain information concerning the rights of each individual user. For example, some users may be restricted to using only certain retail terminals 24 and may be restricted from unlocking any or certain computers 10 from the docking stations 22.

Furthermore, the user rights table may be maintained in the docking station 22, the network server 34, and/or the portable computer 10. However, it should be appreciated that maintaining the table in the network server 34 alone results in a user rights table which may be easier to maintain, but if the network 38 should fail all retail terminals 24 and computers 10 may be needlessly rendered unusable. Furthermore, if the portable computer 10 does not have a network interface 66, the portable computer 10 would not have access to this table when the portable computer 10 is undocked. As a result, it may be desirable to maintain at least a portion of the table in each portable computer 10 and docking station 22 and have the network server 34 ensure that the tables are up to date.

If, in step 130, it is determined that the attempt to enable the multi-functional retail terminal 24 was invalid, then the routine 100 returns to step 120 thereby allowing another attempt to enable the multi-functional retail terminal 24. It should be appreciated that after a certain number of invalid attempts the multi-functional retail terminal 24 may enter a secured state which would require a system supervisor and/or a person with a certain security level to override the secured state before the multi-functional retail terminal 24 may be used (e.g. a system supervisor may need to send a command from the network server 34). It should be appreciated that this would add an extra level of security that would help defeat repetitive guessing techniques to gain unauthorized access.

If, however, it is determined that the attempt to enable the multi-functional retail terminal 24 was valid, then the routine 100 continues to step 140. In step 140, the multi-functional retail terminal 24 is enabled by deactivating the disabling mechanism 64. It should be appreciated that the only active disabling feature of the disabling mechanism 64 may be a simple password prompt which until satisfied does not allow the user to gain access to the functionality of the multi-functional retail terminal 24. As a result of deactivating the disabling mechanism 64, the portable computer 10 enters a docked, locked, usable state 210. In other words, the portable computer 10 is docked and locked to the docking station 22 and may be used for point of sale transactions or for other tasks.

It should be appreciated that a security log may be maintained in a manner similar to the user rights table. The security log may contain information helpful for maintaining the whereabouts of the portable computer 10. For example the security log may contain information such as the time the enabling attempt of step 120 was made, who made the attempt, the number of invalid enabling attempts made, and any other information helpful for tracking the use of the multi-functional retail terminal 24 and the portable computer 10.

It should further be appreciated that the security log could be updated after nearly every step in the above routine 100 and the following routines 200, 300, 400 in order to maintain a detailed security log of the network 38 or after any action relating to the security of the portable computer 10. However, the security log could be updated less often to lessen data traffic on the network 38 and system response time to user requests.

Figure 6:
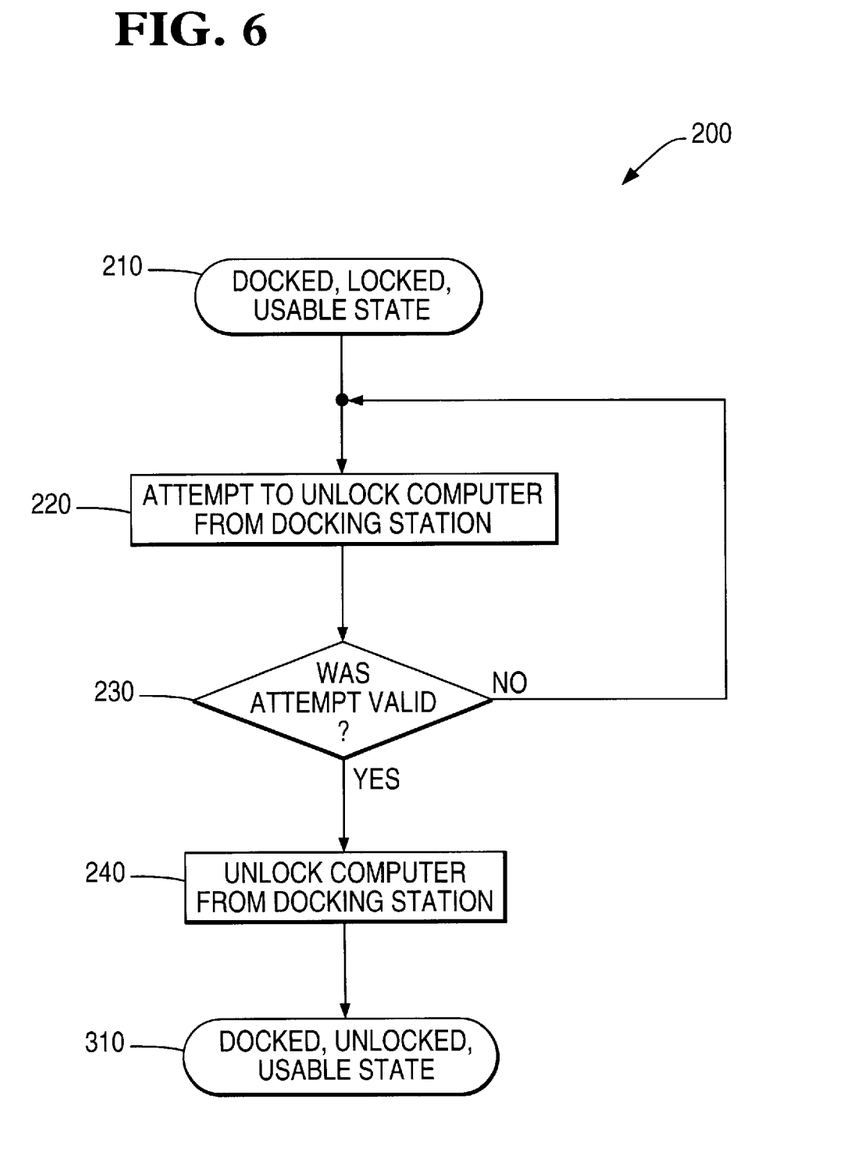
FIG. 6 is a procedural flowchart for unlocking the portable computing device from the docking station.

Now referring to FIG. 6, there is shown a procedural flowchart or routine 200 for unlocking the portable computer 10 from the docking station 22 when the portable computer 10 is in a docked, locked, usable state 210. A user typically wishes to unlock the portable computer 10 from the docking station 22 because the user wishes to undock the portable computer 10 from the docking station 22.

In step 220, an unlocking attempt is made to unlock the portable computer 10 from the docking station 22. This unlocking attempt may be made via several possible techniques which may include (a) a user entering a password via a keyboard, a mouse, or a touch screen; (b) a user swiping a card through a magnetic strip reader; (c) a user swiping a bar code on an I.D. badge; (d) a user speaking into a voice recognition system; (e) a user using a fingerprint reader, hand size reader, or other biometric device; and/or (f) a system administrator, a supervisor, or a scheduling program transmitting a command to the retail terminal via the network 38.

The portable computer 10, the docking station 22, and/or the network server 34 in step 230 determine whether the unlocking attempt in step 220 was valid. The validity of the unlocking attempt may be determined by comparing the information received in step 220 with the user rights table as discussed in above step 130.

If, in step 230, it is determined that the unlocking attempt was invalid, then the routine 200 returns to step 220 thereby allowing another attempt to unlock the portable computer 10 from the docking station 22. It should be appreciated that after a certain number of successive invalid unlocking attempts the multi-functional retail terminal 24 may enter (a) the docked, locked, unusable state 110 thereby invoking the above routine 100, or (b) the secured state discussed above thereby requiring a system supervisor and/or a person with a certain security level to override the secured state before the multi-functional retail terminal 24 could be used.

If, however, it is determined that the unlocking attempt was valid, then the routine 200 continues to step 240. In step 240, the portable computer 10, the docking station, and/or the network server 34 de-activates the locking mechanism 52. As a result of de-activating the locking mechanism 52, the portable computer 10 is no longer locked to the docking station 22, but the portable computer 10 is still docked to the docking station 22 and is still usable. Therefore, the portable computer 10 is now in a docked, unlocked, usable state 310.

It should be appreciated that after it is determined that the unlocking attempt of step 220 is valid, the portable computer 10, the docking station 22, and/or the network server 34 may perform various tests on the portable computer 10 before de-activating the locking mechanism 52 in step 240. For example, the portable computer 10 may test the charge of battery 61 and if the portable computer 10 determines that the battery 61 is inadequately charged the multi-functional retail terminal 24 may notify the user of the inadequate charge of battery 61 and (a) ask whether the user still wants to unlock the portable computer 10, or (b) return to the docked, locked, usable state 210 and notify the user that the portable computer 10 was not unlocked due to the inadequate charge of battery 61.

Figure 7:
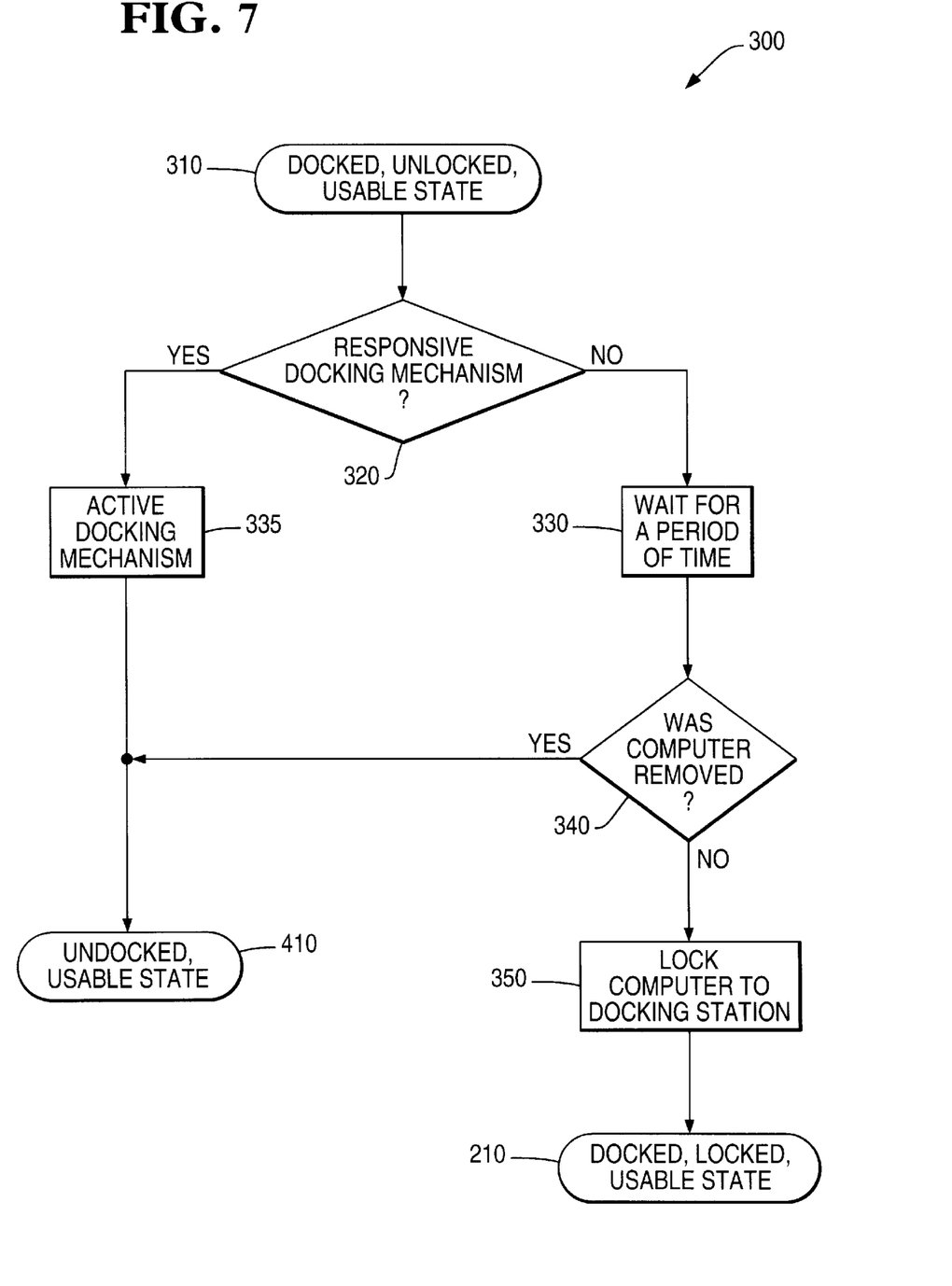
FIG. 7 is a procedural flowchart for undocking the portable computing device from the docking station.

Referring now to FIG. 7, there is shown a procedural flowchart or routine 300 for undocking the portable computer 10 from the docking station 22 when the portable computer 10 is in a docked, unlocked, usable state 310. A user may wish to undock the portable computer 10 from the docking station 22 for various reasons. For example, the user may wish (a) to use the portable computer 10 for inventory counts without being confined to the docking station 22, and/or (b) to use the portable computer 10 for bookkeeping and other managerial duties from a store office or from home.

In step 320, the portable computer 10, the docking station 22, and/or the network server 34 determines whether the multi-functional retail terminal 24 is equipped with an docking mechanism 50 which is responsive to an ejection signal. For example, as stated above the docking mechanism 50 may include a drive motor 50b which is responsive to an ejection signal. If the multi-functional retail terminal 24 is equipped with a responsive docking mechanism 50, then the routine 300 continues on to step 335.

In step 335, the portable computer 10, the docking station 22, and/or the network server 34 activates the docking mechanism 50 to urge the portable computer 10 outwardly from the recess 32 of the base unit 26 and out of operative engagement with the docking station 22. This provides visual feedback to the user that the user may safely remove the portable computer 10 from the docking station 22. As a result, the portable computer 10 is now in an undocked, usable state 410. In other words, the portable computer 10 is not docked to the docking station 22 and is usable for tasks such as inventory counts.

If, however, the multi-functional retail terminal 24 is not equipped with a responsive docking mechanism 50, then the routine 300 continues on to step 330. In step 330, the multi-functional retail terminal 24 waits for a period of time in order to give the user an opportunity to remove the portable computer 10 from the docking station 22. During this period of time the multi-functional retail terminal 24 may provide the user with visual feedback that the portable computer 10 may be removed safely by displaying a message on the display monitor 30. This message may even include a count down timer indicating the time remaining to remove the portable computer 10.

In step 340, the retail terminal determines whether the portable computer 10 was removed from the docking station 22. If the portable computer 10 was removed within the time allowed, then the portable computer 10 enters the undocked, usable state 410. However, if the portable computer 10 was not removed within the time allowed, then the locking mechanism 52 is activated (step 350) and the portable computer 10 enters the docked, locked, usable state 210.

Figure 8:
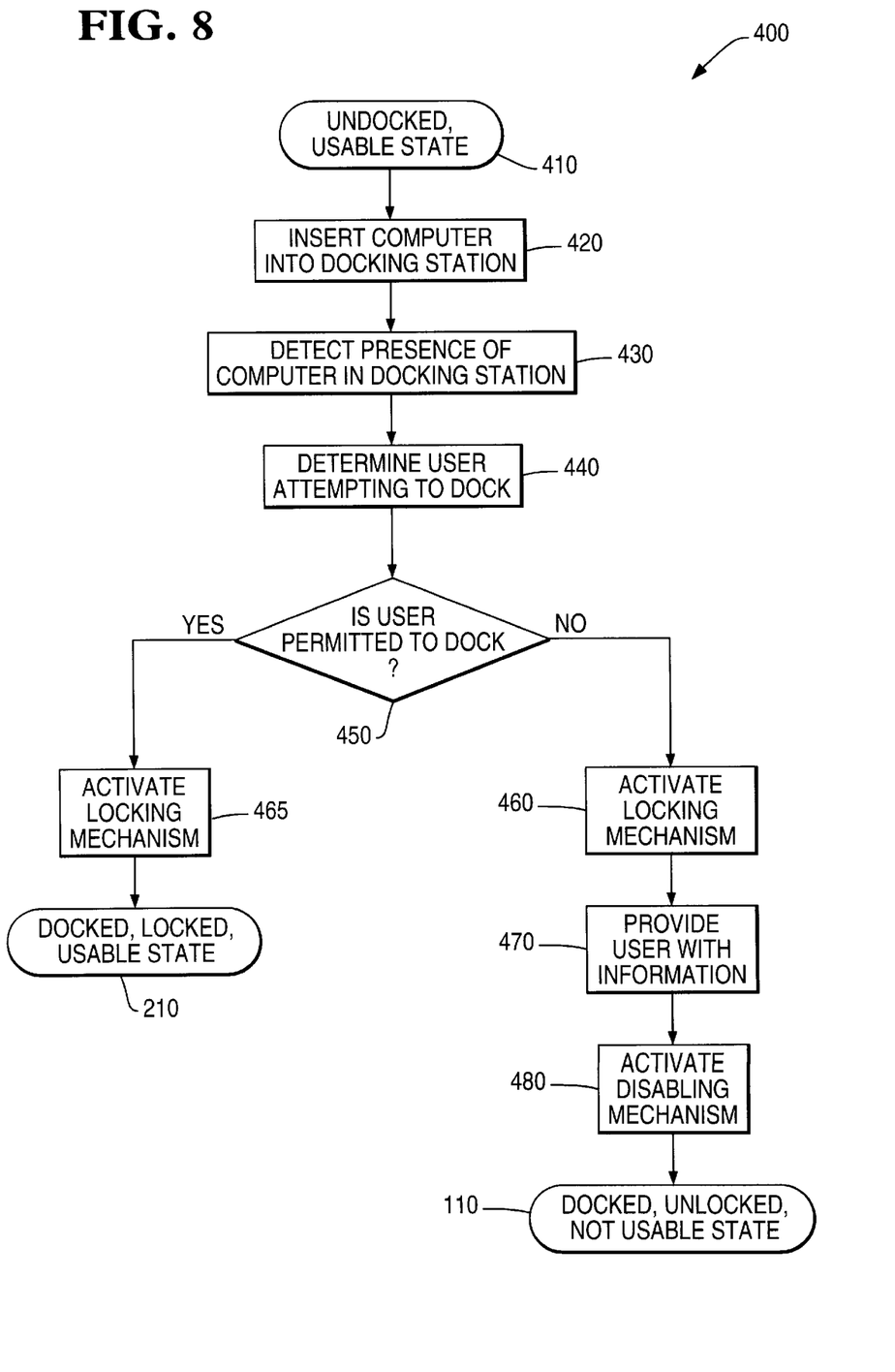
FIG. 8 is a procedural flowchart for docking the portable computing device to the docking station.

Referring now to FIG. 8, there is shown a procedural flowchart or routine 400 for docking the portable computer 10 to the docking station 22 when the portable computer 10 is in a undocked, usable state 410. A user may wish to dock the portable computer 10 from the docking station 22 for various reasons. For example, the user may wish (a) to use the multi-functional retail terminal 24 for a point of sale transaction, and/or (b) to dispose of the portable computer 10 in a secure manner (i.e. the user may be going on break or home for the evening).

The user inserts the portable computer 10 into the recess 32 of the docking station 22 and the docking mechanism 50 operatively couples the portable computer 10 to the docking station 22 (step 420). The multi-functional retail terminal 24, then, determines the presence of the portable computer 10 (step 430). Once the portable computer 10 is detected, in step 440 the user attempting to dock the portable computer 10 is determined. This determination may be accomplished in a manner similar to steps 120 and 220 above (i.e. the user enters some type of identification code) but the user may also be determined from a current user variable maintained in the portable computer 10.

The portable computer 10, the docking station 22, and /or the network server 34 in step 450 determine whether the docking attempt to dock the multi-functional retail terminal 24 in step 440 was valid. The validity of the docking attempt may be determined by comparing the information received in step 440 with the user rights table as discussed above. The docking attempt may not be valid for various reasons, but typical reasons are the user does not have rights to dock to that docking station 22, or the portable computer 10 is assigned to a set of docking stations 22 not including the docking station 22 to which the user is attempting to dock the portable computer 10.

If it is determined that the user is permitted to dock the portable computer 10 to the docking station 22, then the routine 400 continues step 465. In step 465, the locking mechanism 52 is activated and the portable computer 10 is locked to the docking station 22. As a result, the portable computer 10 is now in the docked, locked, usable state 210.

If, however, it is determined that the user is not permitted to dock the compute 10 to the docking station 22, then the routine continues to step 460. In step 460, the locking mechanism 52 is activated and the portable computer 10 is locked to the docking station 22. The multi-functional retail terminal 24, then, provides the user with information for correctly disposing of the portable computer 10 (step 480). Finally, the disabling mechanism 64 is activated thereby disabling the portable computer 10 and the multi-functional retail terminal 24. As a result, the computer is now in the docked, locked, not usable state 110.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

Furthermore, it should be appreciated from the above description that the portable computer 10 may execute all the necessary software needed to provide the functionality of the prior art data collect terminals, POS systems, and multi-functional terminals. Further yet, in the embodiment where the portable computer 10 includes the wireless network interface 66, an undocked portable computer 10 may provide the functionality of these three separate store automation platforms in a portable manner without being restrained to physical location. For example, the undocked portable computer 10 may be used for inventory counts, managerial tasks, and POS transactions. However, in a POS transaction, an undocked portable computer may need to suspend the POS transaction and send the nearly complete POS transaction to a retail terminal in order for a receipt to printed and money to be collected.

What is claimed is:

1. A method for maintaining security of a computer terminal having a docking station and a portable computer, comprising the computer-implemented steps of:

generating electronic information in response to an unlocking attempt to unlock the portable computer from the docking station;

storing a plurality of values that are indicative of valid unlocking attempts;

determining whether the unlocking attempt is valid based upon the electronic information and the plurality of values; unlocking the portable computer from the docking station in response to the determining step determining that the unlocking attempt is valid; and preventing unlocking of the portable computer from the docking station in response to the determining step determining that the unlocking attempt is invalid.

2. The method of claim 1, further including the computer-implemented step of:

updating a security log in response to actions relating to the security of the portable computer.

3. The method of claim 1, wherein:

the generating step includes the computer-implemented step of receiving the unlocking attempt from a user, the plurality of values includes a user rights table, and the step of determining whether the unlocking attempt is valid includes the computer-implemented step of checking the user rights table to determine whether the user has a right to unlock the portable computer from the docking station.

4. The method of claim 1, further including the computer-implemented step of:

disabling the portable computer after a predetermined number of successive invalid unlocking attempts.

5. The method of claim 1, further including the computer-implemented step of:

disabling the portable computer if the portable computer is removed from the docking station prior to unlocking the portable computer from the docking station.

6. The method of claim 1, further including the computer-implemented step of:

undocking the portable computer by urging the portable computer outwardly from the docking station after the step of unlocking the portable computer from the docking station; and updating a security log in response to the undocking step.

7. The method of claim 1, further including the computer-implemented steps of:

receiving the portable computer into the docking station;

detecting the presence of the portable computer when the portable computer is received in the docking station; and locking the portable computer to the docking station when the portable computer is detected.

8. The method of claim 7, further including the computer-implemented step of:

docking the portable computer to the docking station by urging the portable computer into operative engagement with the docking station before locking the portable computer to the docking station.

9. The method of claim 7, further including the computer-implemented steps of:

receiving a locking attempt to lock the portable computer to the docking station; and locking the portable computer to the docking station.

10. The method of claim 1, wherein said receiving step includes the step of:

receiving said electronic information from a data input device that is selected from a group of data input devices consisting of a keyboard, a mouse, a touch screen, a biometric device, a magnetic strip reader, a bar code reader, and a voice recognition system.

11. A multi-functional retail terminal, comprising:

a docking station;

a portable computer;

a coupler configured to detachably couple said portable computer to said docking station; and a locking mechanism configured to unlock said portable device from said docking station in response to determining that an unlocking attempt to unlock said portable computer from said docking station is valid, wherein said docking station includes a retail peripheral, and said portable computer and said docking station are configured to perform a point of sale transaction and general purpose computing, and wherein said docking station and said portable computer are configured to (i) generate electronic information in response to said unlocking attempt, (ii) determine whether said unlocking attempt is valid based upon said electronic information and a plurality of stored values that are indicative of valid unlocking attempts, and (iii) prevent unlocking of said portable computer from said docking station in response to determining that said unlocking attempt is invalid.

12. The multi-functional retail terminal of claim 11, wherein:

said docking station and said portable device are configured to update a security log in response to actions relating to the security of said portable computer.

13. The multi-functional retail terminal of claim 11, wherein said portable computer comprises:

a disabling mechanism which when activated disables said portable computer.

14. The multi-functional retail terminal of claim 13, wherein said disabling mechanism is configured to disable said portable computer if said portable computer is de-coupled from said docking station prior to de-activating the locking mechanism.

15. The multi-functional retail terminal of claim 11, further comprising a data input device that is selected from a group of data input devices consisting of a keyboard, a mouse, a touch screen, a biometric device, a magnetic strip reader, a bar code reader, and a voice recognition system, wherein:

said portable computer and said docking station are further configured to receive said electronic information from said data input device.

16. A retail network, comprising:

a network server;

a docking station;

a portable computer;

a coupler configured to detachably couple said portable computer to said docking station;

a network interface configured to provide a communications link between said network server and said docking station; and a locking mechanism configured to unlock said portable device from said docking station in response to determining that an unlocking attempt to unlock said portable computer from said docking station is valid, wherein said docking station includes a retail peripheral, and said portable computer and said docking station are configured to perform a point of sale transaction and general purpose computing, wherein a plurality of values that are indicative of valid unlocking attempts are stored in said network server, and wherein said docking station and said portable computer are configured to (a) generate electronic information in response to said unlocking attempt, (b) determine whether said unlocking attempt is valid based upon said electronic information and said plurality of values stored in said network server, and (c) prevent unlocking of said portable computer from said docking station in response to determining that said unlocking attempt is invalid.

17. The retail network of claim 16, wherein:

said network server, said docking station, and said portable device are configured to update a security log in response to actions relating to the security of said portable computer.

18. The retail network of claim 17, wherein said portable computer comprises:

a disabling mechanism which when activated disables said portable computer.

19. The retail network of claim 18, wherein said disabling mechanism is configured to disable said portable computer if said portable computer is de-coupled from said docking station prior to de-activating the locking mechanism.

20. The retail network of claim 19, wherein said portable computer further comprises:

a wire-less network interface configured to provide a wire-less communications link between said portable computer and said network server;

wherein said disabling mechanism is configured to activate in response to a disabling signal; and wherein said network server is configured to send said disabling signal to said portable computer via said wire-less network interface when said network server determines a security violation involving said portable computer has occurred.

21. The retail network of claim 16, further comprising a data input device that is selected from a group of data input devices consisting of a keyboard, a mouse, a touch screen, a biometric device, a magnetic strip reader, a bar code reader, and a voice recognition system, wherein:

said portable computer and said docking station are further configured to receive said electronic information from said data input device.

\* \* \* \* \*